(12) United States Patent
Hoshino et al.

(10) Patent No.: US 11,781,927 B2
(45) Date of Patent: Oct. 10, 2023

(54) TORQUE SENSOR

(71) Applicant: NIDEC COPAL ELECTRONICS CORPORATION, Tokyo (JP)

(72) Inventors: Keiya Hoshino, Sano (JP); Takayuki Endo, Sano (JP); Ryuji Hokari, Sano (JP)

(73) Assignee: NIDEC COPAL ELECTRONICS CORPORATION, Tokyo (JP)

( * ) Notice: Subject to any disclaimer, the term of this patent is extended or adjusted under 35 U.S.C. 154(b) by 395 days.

(21) Appl. No.: 17/147,146

(22) Filed: Jan. 12, 2021

(65) Prior Publication Data

US 2021/0131891 A1    May 6, 2021

Related U.S. Application Data

(63) Continuation of application No. PCT/JP2019/018146, filed on Apr. 26, 2019.

(30) Foreign Application Priority Data

Jul. 13, 2018  (JP) ................................ 2018-133260

(51) Int. Cl.
  *G01L 3/00*   (2006.01)
  *G01L 3/10*   (2006.01)
  *G01L 5/00*   (2006.01)
  *B25J 19/02*  (2006.01)

(52) U.S. Cl.
  CPC ............ *G01L 3/108* (2013.01); *G01L 5/0061* (2013.01); *B25J 19/02* (2013.01)

(58) Field of Classification Search
  CPC ......... G01L 3/108; G01L 5/0061; B25J 19/02
  See application file for complete search history.

(56) References Cited

U.S. PATENT DOCUMENTS

| 4,836,034 A | * | 6/1989 | Izumi | ...................... G01L 5/162 |
| | | | | 73/862.044 |
| 5,889,214 A | * | 3/1999 | Kang | ..................... G01L 5/1627 |
| | | | | 73/862.043 |
| 6,038,933 A | * | 3/2000 | Meyer | ....................... G01L 5/20 |
| | | | | 73/146 |

(Continued)

FOREIGN PATENT DOCUMENTS

| CN | 1914493 | 2/2007 |
| CN | 103080716 | 5/2013 |

(Continued)

OTHER PUBLICATIONS

International Search Report for International Application PCT/JP2019/018146, dated Jul. 16, 2019.

(Continued)

*Primary Examiner* — Max H Noori
*Assistant Examiner* — Masoud H Noori
(74) *Attorney, Agent, or Firm* — Burris Law, PLLC

(57) ABSTRACT

A torque sensor which can improve detection accuracy is provided. The torque sensor includes a first structure, a second structure, a third structure provided between the first structure and the second structure and at least two sensor portions provided between the first structure and the second structure, and a stiffness of one of the first structure and the second structure, closer to the sensor portions is higher than that of the other one.

14 Claims, 7 Drawing Sheets

(56) References Cited

U.S. PATENT DOCUMENTS

| | | | | |
|---|---|---|---|---|
| 10,955,309 B2* | 3/2021 | Suzuki | | G01L 5/0071 |
| 2005/0151448 A1* | 7/2005 | Hikida | | G01C 9/12 |
| | | | | 310/338 |
| 2009/0320610 A1* | 12/2009 | Ohsato | | G01L 1/18 |
| | | | | 29/621.1 |
| 2011/0239784 A1* | 10/2011 | Ohsato | | G01P 15/123 |
| | | | | 73/514.33 |
| 2015/0300895 A1 | 10/2015 | Matsudate et al. | | |
| 2016/0334288 A1 | 11/2016 | Berme et al. | | |
| 2017/0080573 A1* | 3/2017 | Yeum | | B25J 19/022 |
| 2017/0191882 A1* | 7/2017 | Okada | | G01L 1/04 |
| 2017/0205296 A1 | 7/2017 | Bradford | | |
| 2017/0266814 A1 | 9/2017 | Uemura et al. | | |
| 2019/0064018 A1 | 2/2019 | Miyazawa | | |
| 2019/0113407 A1 | 4/2019 | Okada et al. | | |
| 2019/0310146 A1* | 10/2019 | Suzuki | | G01L 3/108 |
| 2020/0400515 A1* | 12/2020 | Endo | | G01B 7/18 |
| 2021/0033475 A1* | 2/2021 | Yamaguchi | | G01L 5/162 |
| 2021/0325264 A1* | 10/2021 | Endo | | B25J 13/085 |
| 2021/0325266 A1* | 10/2021 | Endo | | G01L 1/2206 |

FOREIGN PATENT DOCUMENTS

| | | |
|---|---|---|
| CN | 107407607 | 11/2017 |
| CN | 108139288 | 6/2018 |
| CN | 207556719 | 6/2018 |
| EP | 3219449 | 9/2017 |
| EP | 3418704 | 12/2018 |
| JP | H05187940 | 7/1993 |
| JP | 2001021427 | 1/2001 |
| JP | 2010169586 | 8/2010 |
| JP | 2010185725 | 8/2010 |
| JP | 2011209178 | 10/2011 |
| JP | 2013096735 | 5/2013 |
| JP | 2015049209 | 3/2015 |
| JP | 2016070673 | 5/2016 |
| JP | 2017172983 | 9/2017 |
| JP | 2017203645 | 11/2017 |
| WO | 2014156823 | 10/2014 |
| WO | 2017195420 | 11/2017 |
| WO | 2018041974 | 3/2018 |

OTHER PUBLICATIONS

Office Action issued in corresponding JP Application 2018-133260, dated Jun. 21, 2022, and an English Translation.

Office Action issued in corresponding CN Application No. 201980046901.5, dated Nov. 3, 2021, and English translation thereof.

Extended European Search Report issued in corresponding EP Application 19833689.3, dated Apr. 8, 2022, 9 pages.

Third Party Observations submitted to the European Patent Office in corresponding EP Application 19833689.3, submitted Feb. 15, 2023, transmitted by EPO Feb. 23, 2023, 18 pages.

Office Action and Search Report issued in corresponding TW Application 108116531, dated Jan. 19, 2023, and an English Translation, 12 pages.

* cited by examiner

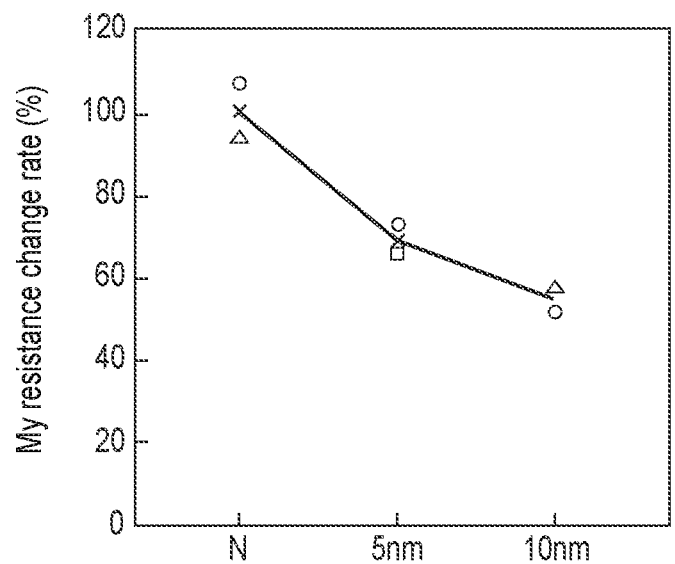
F I G. 10
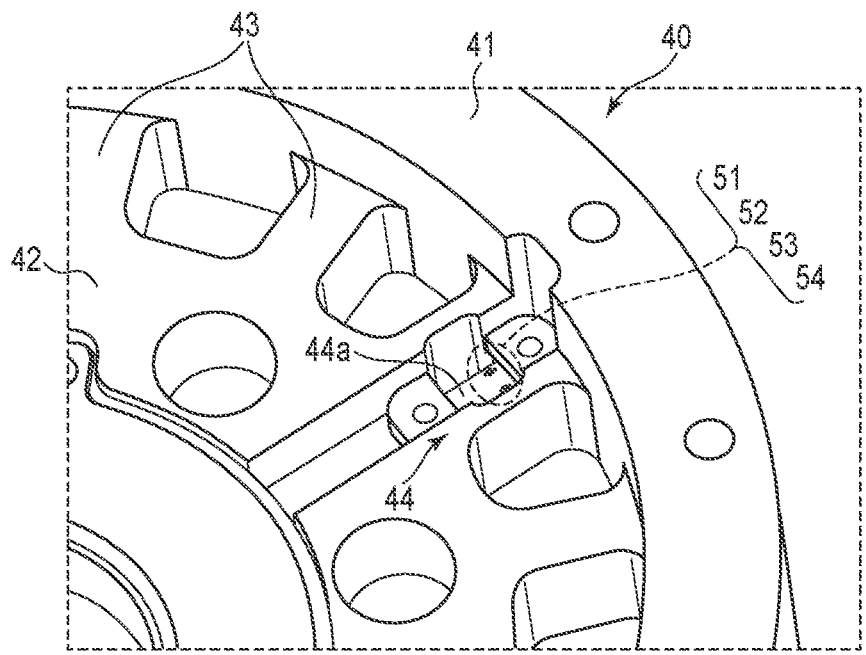
F I G. 11

TORQUE SENSOR

CROSS-REFERENCE TO RELATED APPLICATIONS

This application is a continuation of International Application No. PCT/JP2019/018146, filed on Apr. 26, 2019, which claims priority to and the benefit of Japanese Patent Application No. 2018-133260, filed on Jul. 13, 2018. The disclosures of the above applications are incorporated herein by reference.

FIELD

The present disclosure relates to a torque sensor to be applied to, for example, a robot arm or the like.

BACKGROUND

A torque sensor includes a first structure to which torque is applied, a second structure from which torque is output, and a plurality of strain parts serving as beams connecting the first structure and the second structure, and a plurality of strain gauges serving as sensor elements are arranged on the strain parts. A bridge circuit is constituted by these strain gauges (cf., for example, Patent Literature 1 (JP 2013-096735 A), Patent Literature 2 (JP 2015-049209 A) and Patent Literature 3 (JP 2017-172983 A)).

In a torque amount converter which measures a torque generated in an output unit of an engine, etc., of an automobile, a technique for reducing an influence of a bending stress other than the torque has been developed (cf., for example, Patent Literature 4 (JP 2010-169586 A)).

SUMMARY

For example, a disk-shaped torque sensor comprises a first structure, a second structure and a third structure between the first structure and the second structure, and as sensors, a strain body and a strain gage are provided between the first structure and the second structure.

When a base of a robot arm via a drive unit including a motor and a speed reducer, and the second structure is fixing to, for example, an arm of the robot, to be used, a bending moment accompanying a transfer weight of the robot arm, a distance to the load and acting acceleration, and a load of its reaction force are applied to the torque sensor, other than the torque.

Thus, when a bending moment or a weight (Fx in an X-axis direction, Fy in a Y-axis direction and Fz in a Z-axis direction), that is, a translation force, which is other than the torque, is applied to the torque sensor, an asymmetrical displacement (strain) occurs due to structural asymmetry and load asymmetry despite that the gage is disposed to make the strain symmetric. For this reason, a sensor output is generated by interference of other axis, thereby causing the lowering the detection accuracy of the torque sensor.

The embodiments provide a torque sensor which can improve the detection accuracy.

According to one embodiment, a torque sensor comprises a first structure, a second structure, a third structure provided between the first structure and the second structure and at least two sensor portions provided between the first structure and the second structure, and a stiffness of one of the first structure and the second structure, closer to the sensor portions is higher than that of the other one of the first structure and the second structure, located farther from the sensor portions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 10 is a diagram illustrating an effect of the second embodiment.

FIG. 11 is a perspective diagram showing a main portion of the third embodiment.

DETAILED DESCRIPTION

Figure 1:
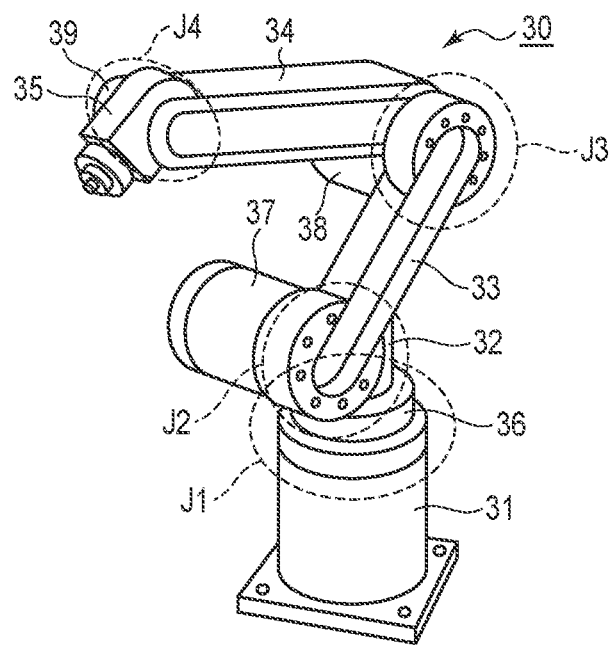
FIG. 1 is a perspective diagram showing an example of a robot arm to which the first embodiment is applied.

Embodiments of the present invention will be described below with reference to the accompanying drawings. In the drawings, elements similar to those disclosed in the above embodiments are denoted by similar reference numbers.

First, a robot arm 30 and torque sensor 40 to which the embodiment is applied will be described below with reference to FIGS. 1 and 2.

FIG. 1 shows an example of an articulated robot, i.e., the robot arm 30. The robot arm 3 is provided with, for example, a base 31, a first arm 32, a second arm 33, a third arm 34, a fourth arm 35, a first drive unit 36 serving as a drive source, a second drive unit 37, a third drive unit 38, and a fourth drive unit 39. However, the configuration of the robot arm 30 is not limited to this and is modifiable.

The first arm 32 is made rotatable relatively to the base 31 by the first drive unit 36 provided in a first joint J1. The second arm 33 is made rotatable relatively to the first arm 32 by the second drive unit 37 provided in a second joint J2. The third arm 34 is made rotatable relatively to the second arm 33 by the third drive unit 38 provided in a third joint J3. The fourth arm 35 is made rotatable relatively to the third arm 34 by the fourth drive unit 39 provided in a fourth joint J4. A hand and various types of tools which are not shown are attached to the fourth arm 35.

Each of the first to fourth drive units 36 to 39 is provided with, for example, a motor, a speed reducer and a torque sensor, which are to be described later.

First Embodiment

Figure 2:
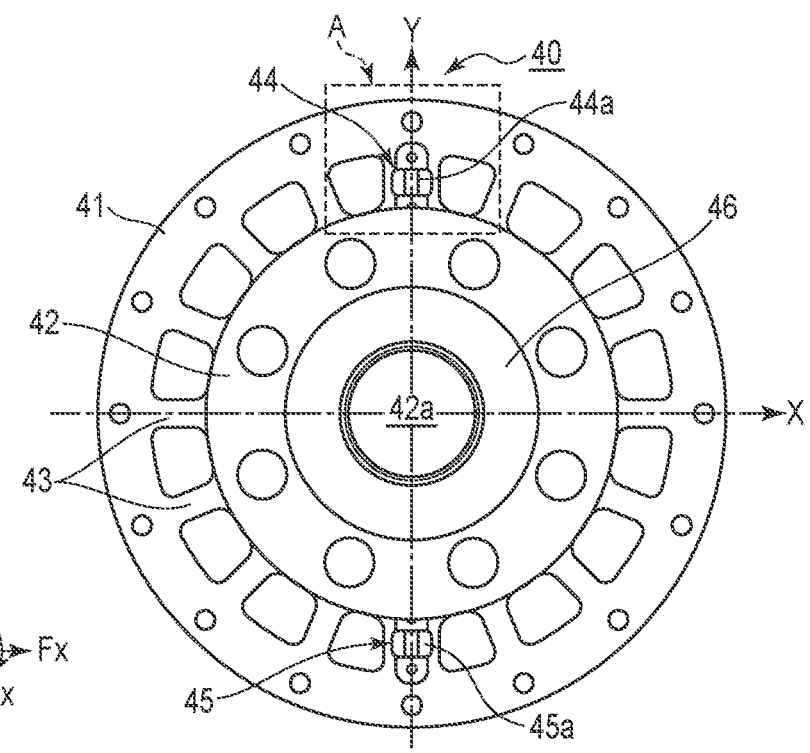
FIG. 2 is a plan view showing an example of a torque sensor according to the first embodiment.
Figure 3:
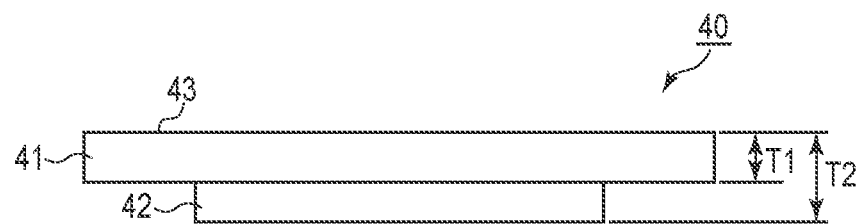
FIG. 3 is a side-view of FIG. 2.
Figure 4:
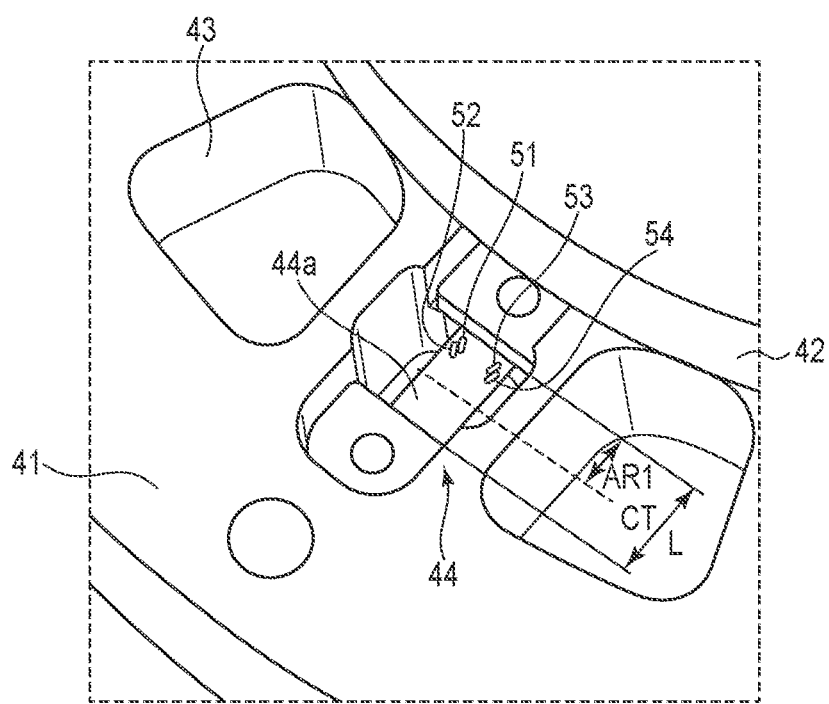
FIG. 4 is a partially enlarged perspective diagram showing a part indicated by A in FIG. 2.

FIGS. 2 to 4 show a disk-shaped torque sensor 40 according to the embodiment. The torque sensor 40 is provided in, for example, the first drive unit 36 of the robot arm 30. However, the torque sensor 40 can be provided in, for example, the second drive unit 37 to the fourth drive unit 39 of the robot arm 30.

The torque sensor 40 is provided with a first structure 41, a second structure 42, a plurality of third structures 43, a first strain sensor 44 and a second strain sensor 45 both serving as a sensor portion, and the like.

The first structure 41 and second structure 42 are formed annular, and the diameter of the second structure 42 is smaller than the diameter of the first structure 41. The second structure 42 is arranged concentric with the first structure 41, and the first structure 41 and the second structure 42 are coupled to each other by the third structures 43 serving as a plurality of radially arranged beams. The plurality of third structures 43 transmits torque between the first structure 41 and second structure 42. The second structure 42 includes a hollow section 42a and, for example, wiring (not shown) is passed through the hollow section 42a.

The first arm 32 and the like, to which the torque sensor 40 is attached are formed of, for example, aluminum. Therefore, the first structure 41, the second structure 42 and the plurality of third structures 43 are constituted of a metal material having a Young's modulus higher than that of aluminum, that is, for example, stainless steel, materials other than the metal can also be used if mechanical strength sufficient to withstand the applied torque or bending moment can be obtained.

Between the first structure 41 and the second structure 42, the first strain sensor 44 and the second strain sensor 45 are provided. More specifically, one ends of a strain body 44a constituting the first strain sensor 44 and a strain body 45a constituting the second strain sensor 45 are joined to the first structure 41, and the other ends of the strain bodies 44a and 45a are joined to the second structure 42.

A thickness of each of the strain bodies 44a and 45a is less than the thickness of each of the first structure 41, the second structure 42, and the plurality of third structures 43.

The first strain sensor 44 and the second strain sensor 45 are placed at symmetric positions with respect to centers of the first structure 41 and the second structure 42 (each center of action of the torque). In other words, the first strain sensor 44 and the second strain sensor 45 are placed on diameters of annular shapes of the first structure 41 and the second structure 42.

On each of the surfaces of the strain bodies 44a and 45a, a plurality of strain gages are provided as will be described later. The strain gages of the strain bodies 44a and 45a each constitutes a bridge circuit. The strain body 44a and strain body 45a are connected to flexible substrates (not shown), respectively. The flexible substrates are connected to a printed-circuit board (not shown) covered by a cover 46. On the printed-circuit g board, operational amplifiers and the like configured to amplify output voltages of the two bridge circuits are arranged. The circuit configuration is not the nature of this embodiment, and hence a description thereof is omitted.

FIG. 4 is an expanded diagram of a region A shown in FIG. 2. On a surface of the strain body 44a, for example, four strain gages 51, 52, 53 and 54 are provided as sensor elements. A bridge circuit is constructed by the four strain gage 51, 52, 53 and 54.

In the first embodiment, the strain gages 51, 52, 53 and 54 are placed, for example, on an area AR1 on a second structure 42 side with respect to a central part CT of an effective length L of the strain body 44a (a length of a portion acting as the strain body). This area AR1 is a region where a large strain is created in the strain body 44a within a range of the effective length L of the strain body 44a, and also sensitivity of the first strain sensor 44 to the forces of the directions other than that of the torque, that is, the directions of Fx and My and sensitivity of the first strain sensor 44 in the torque (Mz) direction are equalized to each other.

Hereinafter, a side of the first structure 41 and the second structure 42, which is near the strain gages 51, 52, 53 and 54 is referred to as a detection side. In the first embodiment, the second structure 42 is equivalent to the detection side.

The second strain sensor 45 is formed to be identical to the first strain sensor 44 in structure, and the second structure 42 is equivalent to the detection side in the second strain sensor 45 as well.

In the first embodiment, the stiffness of those structures of the torque sensor 40, located on the detection side is higher than the stiffness of the other structures. In other words, in the torque sensor 40, the stiffness of the second structure 42 is set higher than the stiffness of the first structure 41 or the third structures 43.

More specifically, as shown in FIG. 3, a thickness T2 of the second structure 42 is set greater than a thickness T1 of the first structure 41 and the third structures 43.

To the first structure 41 of the torque sensor 40 configured as above, for example, the first arm 32 is attached, and the second structure 42 is fixed to the base 31 via the first drive unit 36 including the motor and the speed reducer (not shown). However, the first structure 41 of the torque sensor 40 can be fixed to the base 31 via the first drive unit 36 and the second structure 42 can be fixed, for example, to the first arm 32.

In this state, when the first drive unit 36 is driven, the force of the torque (Mz) direction shown in FIG. 2 is applied to the torque sensor 40. The first structure 41 of the torque sensor 40 is displaced in the torque (Mz) direction with respect to the second structure 42. As the first structure 41 is displaced with respect to the second structure 42, electric signals are output from the first strain sensor 44 and the second strain sensor 45, and thus the torque sensor 40 can detect the torque.

On the other hand, when a bending moment of a direction other than the torque (Mx, My) directions occurs to the first arm 32 due to the operation of the first arm 32 to the fourth arm 35, the bending moment and the translation force are applied to the first structure 41. However, the second structure 42 has a stiffness higher than that of the first structure 41 and the third structures, and therefore deformation of the second structure 42 is suppressed. Thus, variation in resistance value of the plurality of strain gages constituting the first strain sensor 44 and the second strain sensor 45 can be inhibited. Thus, the output of the signals to the bending moment of the direction other than the torque (Mx, My)

direction can be inhibited, thereby making it possible to improve the accuracy of detection of the torque.

In the first embodiment, to enhance the stiffness of the second structure 42, the thickness of the second structure 42 is set greater than the thickness of the first structure 41 and the third structures 43. However, the configuration is not limited to this. The second structure 42 can be formed from a material having a Young's modulus higher than that of the first structure 41 and the third structures 43. In this case, the second structure 42 need not be thicker than the first structure 41 or the third structures 43, but the thickness thereof may be less than or equal to that of the first structure 41 and the third structures 43.

Effect of First Embodiment

According to the first embodiment, the strain gages 51, 52, 53 and 54, which constitute the first strain sensor 44 and the second strain sensor 45 are disposed in the region on the second structure 42 side with respect to the effective length of the strain body 44a, and the second structure 42 close to the strain gages 51, 52, 53 and 54 has a stiffness higher than that of the first structure 41 and third structures 43. With this structure, if a bending moment and a translation force other than the torque are applied to the first structure 41, the deformation of the second structure 42 can be suppressed, and therefore the variation in resistance value of the plurality of strain gages which constitute the first strain sensor 44 and the second strain sensor 45 can be inhibited. Thus, the output of the signals with respect to the bending moment other than the torque can be inhibited, thereby making it possible to improve the accuracy of detection of the torque.

Further, in order to enhance the stiffness of the torque sensor 40, the thickness of only the second structure 42 located on the detection side is increased without thickening the overall thickness of the torque sensor 40. In this manner, as compared to the case of increasing the overall thickness of the torque sensor 40, the weight of the torque sensor 40 can be decreased for obtain the necessary performance.

Furthermore, only the second structure 42 is thickened without increasing the overall thickness of the torque sensor 40, and therefore it is possible to prevent the first drive unit 36 from thickening, to which the torque sensor 40 is attached.

Second Embodiment

Figure 5:
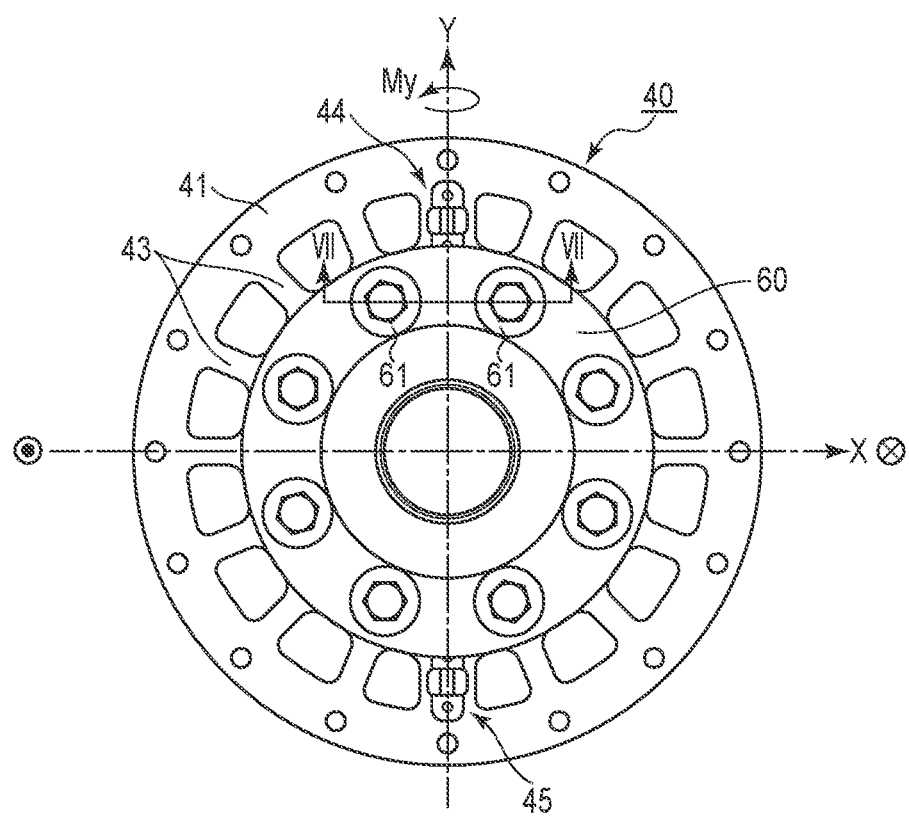
FIG. 5 is a plan view showing an example of a torque sensor according to the second embodiment.
Figure 6:
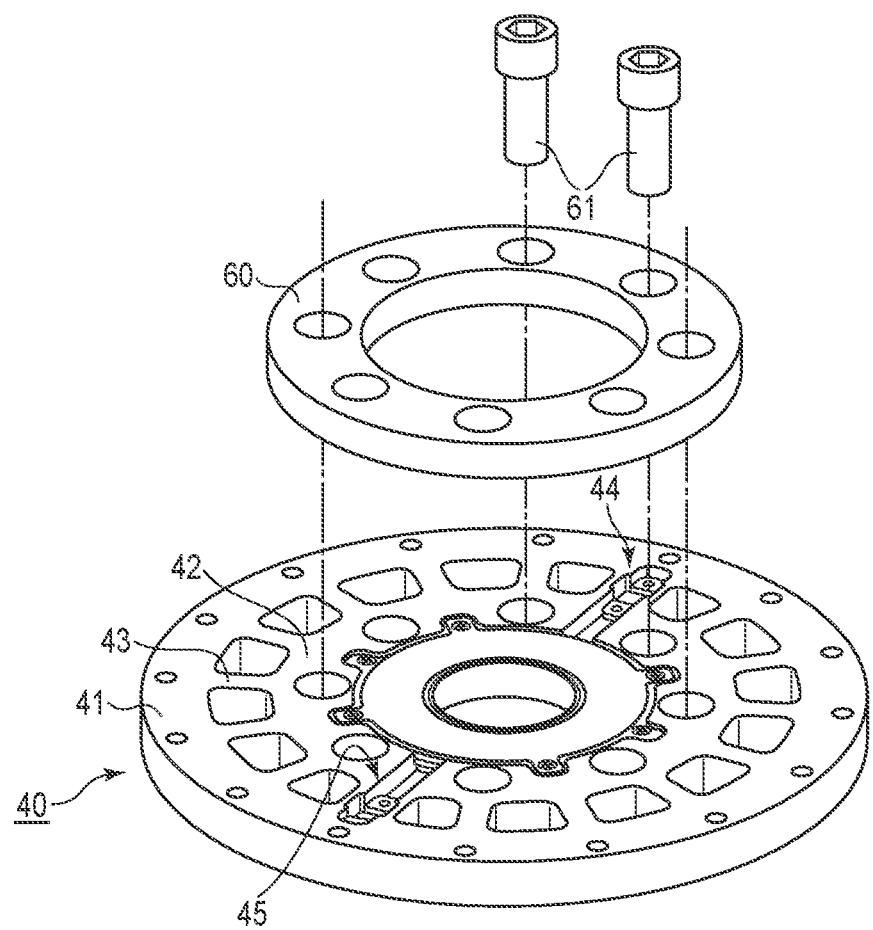
FIG. 6 is an exploded perspective diagram showing a main portion shown in FIG. 5.

FIGS. 5 and 6 illustrate the second embodiment. In the first embodiment, the thickness of the second structure 42 is set greater than that of the first structure 41 and the third structures 43 in order to enhance the stiffness of the second structure 42 higher than the stiffness of the first structure 41 and the third structures 43.

On the other hand, in the second embodiment, the first structure 41, the second structure 42 and the third structures 43 of the torque sensor 40 are equal to each other in thickness, but in order to enhance the stiffness of the second structure 42 higher than the stiffness of the first structure 41 and the third structures 43, an adapter 60 as a reinforcing member is attached to the second structure 42 as shown in FIG. 6. More specifically, the adapter 60 having a ring shape is fixed, for example, to one surface of the second structure 42 with a plurality of screws 61.

The material of the adapter 60 may be the same as that of the torque sensor 40, or a material having a Young's modulus higher than that of the material of the torque sensor 40.

As shown in FIGS. 5 and 6, in the case where the adapter 60 is attached to the torque sensor 40 with the screws 61 and when a rotation moment My is applied to the torque sensor 40, for example, symmetrically with respect to the Y-axis as a center, a portion of the fastening parts of the screws 61, which in not easily subjected to torsion, is less susceptible to the influence of the other axis.

The second embodiment illustrates a case where the screws 61 are placed in position spaced apart from a diameter (Y-axis) which connects the first strain sensor 44 and second strain sensor 45 to each other. More specifically, two screws 61 are placed, for example, in symmetric positions with respect to the diameter (Y-axis) connecting the first strain sensor 44 and the second strain sensor 45 to each other.

Figure 7:
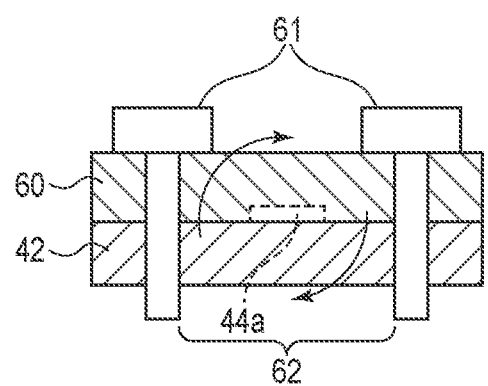
FIG. 7 is a cross-sectional view taken along the line VII-VII in FIG. 5.

FIG. 7 shows positions of the two screws 61 placed in the vicinity of the first strain sensor 44 and the strain body 44a in relation to each other. The two screws 61 are placed in the symmetric positions with respect to the strain body 44a (Y-axis) at the center.

Thus, when the two screws 61 are placed in the symmetric positions with respect to the first strain sensor 44, the thickness of the portion corresponding to the first strain sensor 44 is increased by the adapter 60, the polar moment of inertia near the first strain sensor 44 is increased, and therefore it is difficult for the portion to be twisted. Therefore, when the rotation moment My is applied to the torque sensor 40 with respect to the Y-axis at the center, torsion which may occur in the fastening portion 62 located between the two screw 61 can be reduced, thereby making it possible to suppress the influence of the other axis.

FIG. 5 shows a case where the two screws 61 are placed in the symmetric positions with respect to the first strain sensor 44, but the screws 61 may be placed on a line connecting the first strain sensor 44 and the second strain sensor 45 to each other. With the screws 61 provided at positions other than on the line connecting the first strain sensor 44 and the second strain sensor 45, the polar moment of inertia can be increased, thereby making it even more difficult to be twisted.

Effect of Second Embodiment

According to the second embodiment as well, the interference of other axis can be reduced and the accuracy of detection of the torque can be improved as in the first embodiment.

Further, in the second embodiment, the adapter 60, separate from the torque sensor 40, is employed. Therefore, the stiffness of the adapter 60 can be easily adjusted depending on the condition of use. Thus, it is possible to easily set the optimal stiffness according to the use condition.

Further, by using a material different from that of the torque sensor 40 for the adapter 60, the thickness of the adapter 60 can be decreased to obtain necessary stiffness. Thus, the torque sensor 40 can be further thinned.

Furthermore, by using the adapter 60 separate from the torque sensor 40, the number of processing steps for processing the torque sensor 40 can be reduced as compared to that of the first embodiment.

The shape of the adapter 60 is similar to the torque sensor 40 and annular, which is easy to process, and therefore the number of processing steps can be reduced, thus making it possible to suppress the increase in production cost.

Further, the screws 61 to fix the adapter 60 to the second structure 42 are placed symmetrically with respect to the first strain sensor 44 and the second strain sensor 45. With this structure, the rotation moment My is applied to the torque sensor 40 with respect to the Y-axis as the center, torsion which may occur in the fastening portion 62 located between two screw 61 corresponding to the first strain sensor 44 and second strain sensor 45, respectively, can be reduced. Therefore, the influence of the interference of other axis can be reduced, and the accuracy of detection of the torque can be improved.

Figure 8:
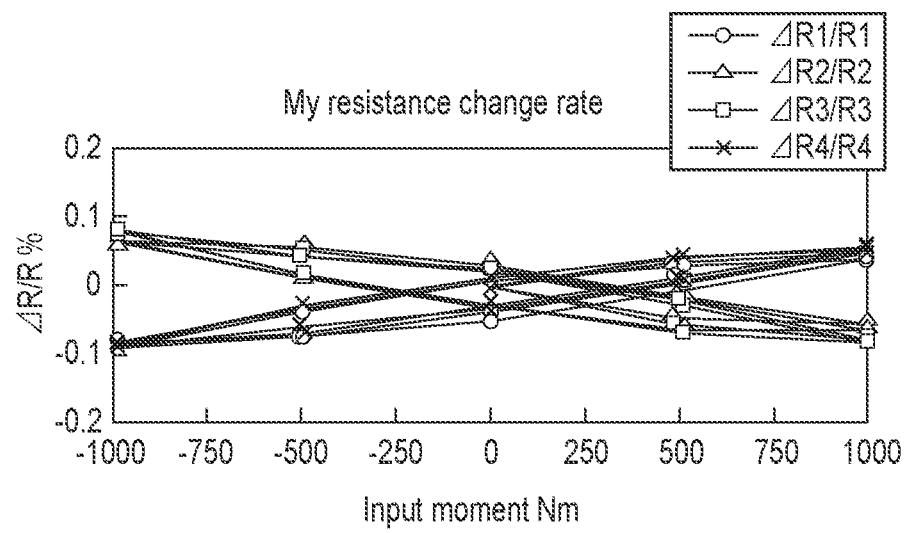
FIG. 8 is a diagram illustrating an effect of the second embodiment.

FIG. 8 shows the rate of change in resistance of the strain gages 51, 52, 53 and 54 when the rotation moment (input moment) My is applied to the torque sensor 40 symmetrically with respect to the Y-axis at the center in the case where the adapter 60 is attached to the torque sensor 40.

Here, R1, R2, R3 and R4 indicate resistances of the strain gages 51, 52, 53 and 54, respectively.

Since the change in resistance with respect to the rotation moment has a hysteresis, FIG. 8 shows results obtained when the rotation moment is applied to the torque sensor 40 two times.

Figure 9:
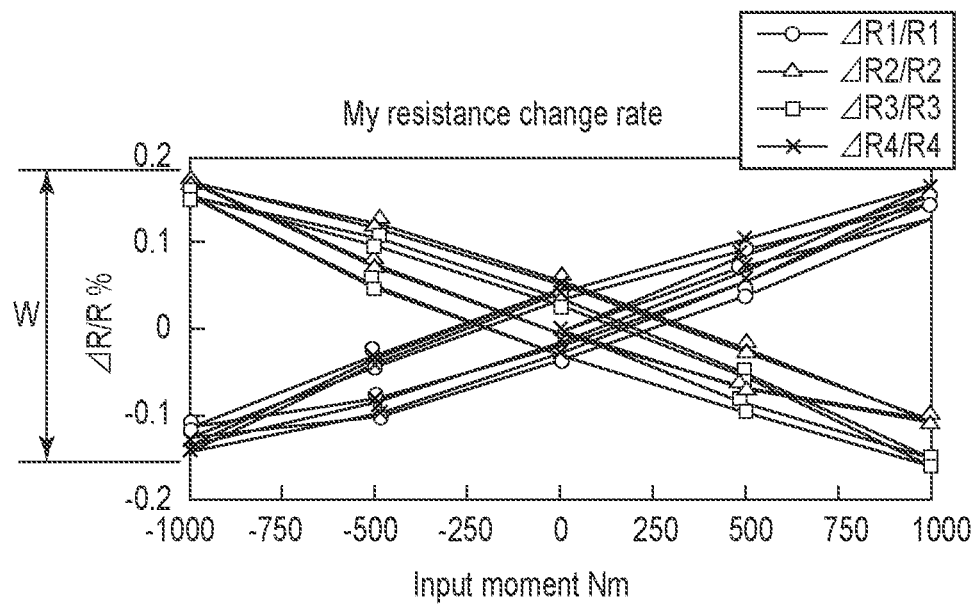
FIG. 9 is a diagram showing a comparative example of the second embodiment.

FIG. 9 shows a comparative example of that shown in FIG. 8, and it shows the rate of change in resistance when the adapter 60 is removed from the torque sensor 40.

As is clear from FIG. 8, with the adapter 60 attached to the torque sensor 40, the influence of the rotation moment My (the interference of the other axis) is reduced and the change in resistance value is suppressed.

FIG. 10 shows the rate of change in resistance when the thickness of the adapter 60 is changed. A width W of the change in resistance when the adapter 60 shown in the FIG. 9 is not provided is set to 100%, and an average value of the rate of change in resistance is indicated for each of the case where the thickness of the adapter 60 is, for example, 5 mm and 10 mm. Here, N shows the case without the adapter 60.

As is clear from FIG. 10, as the thickness of the adapter 60 increases from case N without the adapter 60 to 5 mm and then to 10 mm, the influence of the interference of the other axis is reduced. That is, it has been found that as the stiffness of the adapter 60 increases, the influence of the interference the other axis is reduced.

Third Embodiment

FIG. 11 illustrates the third embodiment.

In the first embodiment and the second embodiment, the area AR1 in which the strain gages 51, 52, 53 and 54 are placed is in the vicinity of the second structure 42 and the second structure 42 is equivalent to the detection side. Therefore, the stiffness of the second structure 42 is set higher than the stiffness of the first structure 41 and the third structures 43.

In the third embodiment, as shown in FIG. 11, a region where the strain gages 51, 52, 53 and 54 are placed is in the vicinity of the first structure 41, and the first structure 41 is equivalent to the detection side.

The strain gage (not shown) of the second strain sensor 45 is also placed in the vicinity of the first structure 41 as in the case of the strain gage of the first strain sensor 44.

With this structure, the stiffness of the first structure 41 as the detection side is higher than the stiffness of the second structure 42 and the third structures 43.

More specifically, the thickness of the first structure 41 is set greater than the thickness of the second structure 42 and the third structures 43.

As a measure to enhance the stiffness of the first structure 41, the first structure 41 can be formed from a material having a high Young's modulus as in the first embodiment.

Figure 12:
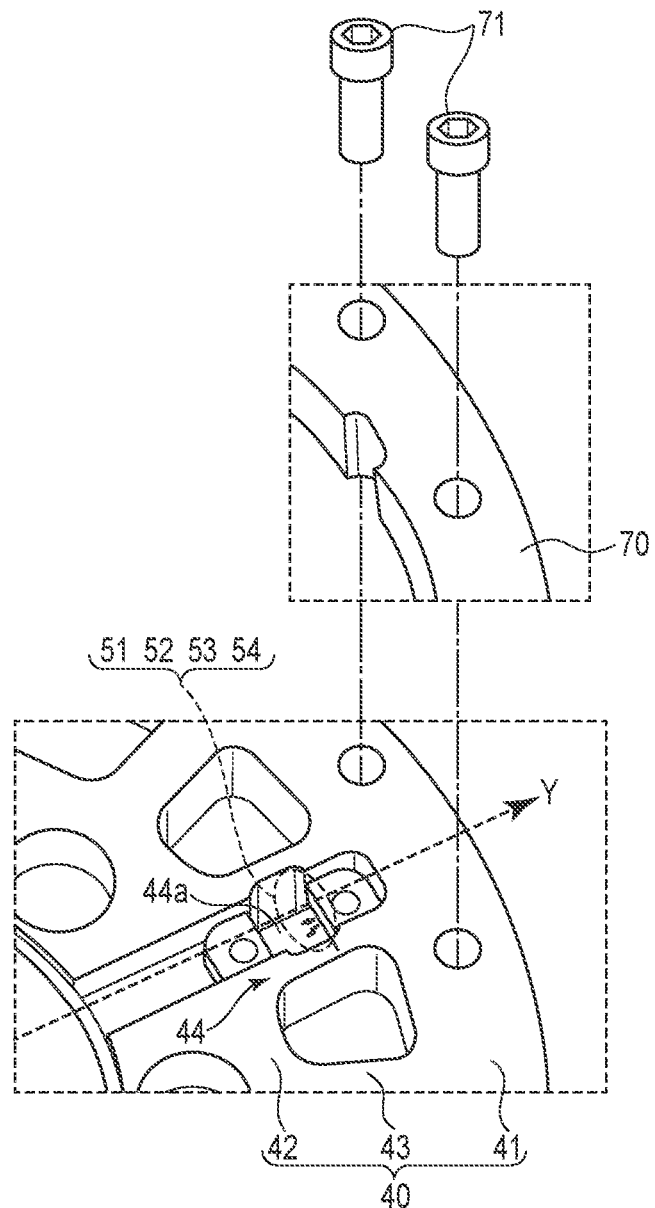
FIG. 12 is a diagram showing a modified example of the third embodiment, which is an exploded perspective diagram showing a main portion thereof.

Further, as shown in FIG. 12, a ring-shaped adapter 70 as a reinforcing member can be attached to one surface of the first structure 41 with a plurality of screws 71 as in the case of the second embodiment. In this case, the first structure 41, the second structure 42 and the third structures 43 are equal to each other in thickness.

Here, when two screws 71 are placed in the positions symmetrical with respect to the first strain sensor 44, the thickness of a portion corresponding to the first strain sensor 44 increases, and therefore the polar moment of inertia increases, making it difficult for the fastening portion to be twisted. Therefore, when the rotation moment My is applied to the torque sensor 40 with respect to the Y-axis at the center, torsion which may occur in the fastening portion located between the two screws 71 can be reduced, and the influence of the interference of the other axis can be lessened.

The screws 71 may be placed on a line connecting the first strain sensor 44 and the second strain sensor 45 to each other. However, with the screws 71 provided at positions other than on the line connecting the first strain sensor 44 and the second strain sensor 45, the polar moment of inertia can be increased, thereby making it even more difficult to be twisted.

Effect of Third Embodiment

According to the third embodiment as well, advantageous effect similar to those of the first embodiment and the second embodiment can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A torque sensor comprising:
a first structure;
a second structure;
a plurality of third structures connected between the first structure and the second structure;
at least two strain bodies, each strain body of the at least two strain bodies coupled between the first structure and the second structure; and
a plurality of sensor elements located on one side with respect to a central part of an effective length of each of the strain bodies, wherein
a stiffness of one of the first structure and the second structure, closer to the sensor elements is higher than that of the other one of the first structure and the second structure, located farther from the sensor elements.

2. The torque sensor of claim 1, wherein
the sensor elements are placed in a vicinity of the second structure.

3. The torque sensor of claim 2, wherein
a thickness of the second structure is greater than a thickness of the first structure and the third structure.

4. The torque sensor of claim 2, wherein
the second structure is formed of a material having a Young's modulus higher than that of the first structure and the third structure.

5. The torque sensor of claim 2, further comprising
a reinforcing member being provided on the second structure.

6. The torque sensor of claim 5, wherein
the first structure, the second structure and the third structure are equal to each other in thickness.

7. The torque sensor of claim 5, further comprising:
screws which fix the reinforcing member to the second structure, wherein
the screws are provided at a position symmetrical to a line connecting the at least two strain bodies.

8. The torque sensor of claim 5, further comprising:
screws which fix the reinforcing member to the second structure, wherein
the screws are provided at a position other than on a line connecting the at least two strain bodies.

9. The torque sensor of claim 1, wherein
the sensor elements are placed in a vicinity of the first structure.

10. The torque sensor of claim 9, wherein
a thickness of the first structure is greater than a thickness of the second structure and the third structure.

11. The torque sensor of claim 9, further comprising
a reinforcing member being provided on the first structure.

12. The torque sensor of claim 11, wherein
the first structure, the second structure and the third structure are equal to each other in thickness.

13. The torque sensor of claim 11, further comprising:
screws which fix the reinforcing member to the first structure, wherein
the screws are provided in a position symmetrical to a line connecting the at least two strain bodies.

14. The torque sensor of claim 11, further comprising:
screws which fix the reinforcing member to the first structure, wherein
the screws are provided in a position other than on a line connecting the at least two strain bodies.

* * * * *